April 18, 1939.  K. O. SWANSON  2,154,543
CONTROLLER FOR ALTERNATING CURRENT MOTORS
Filed May 28, 1938
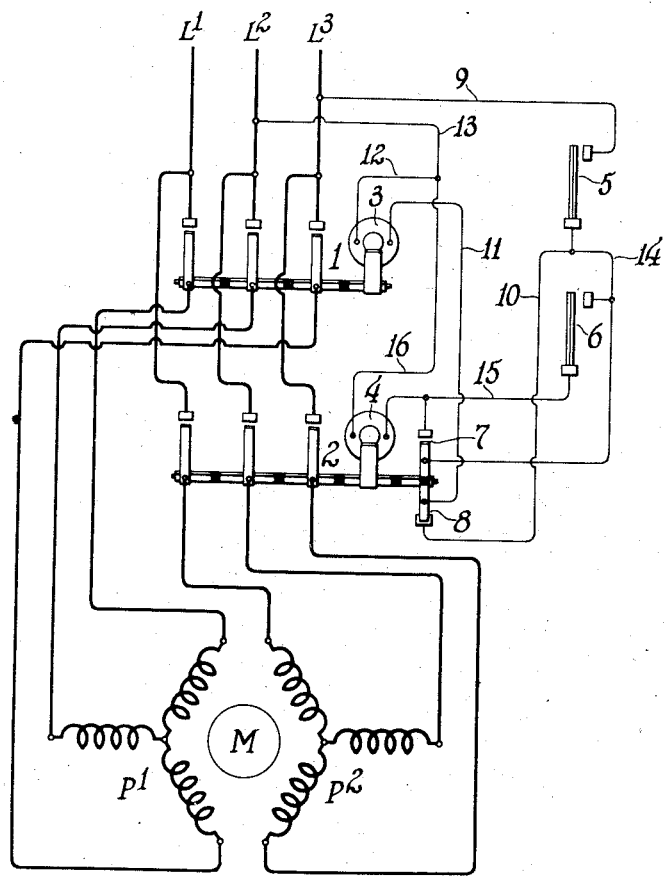

Patented Apr. 18, 1939

2,154,543

UNITED STATES PATENT OFFICE 2,154,543

CONTROLLER FOR ALTERNATING CURRENT MOTORS

Karl O. Swanson, Chicago, Ill., assignor to Cutler-Hammer, Inc., Milwaukee, Wis., a corporation of Delaware Application May 28, 1938, Serial No. 210,649

7 Claims. (Cl. 172—179)

This invention relates to improvements in controllers for alternating current motors, and more particularly for motors having primary windings to be connected in circuit selectively for different speeds.

Controllers embodying the invention are particularly advantageous for motors of the aforementioned type used to drive compressors of air conditioning systems. In such systems it is quite customary to employ thermal switches responsive under different thermal conditions to effect operation of the motor at different speeds, one thermal switch starting the compressor motor for operation at a relatively low speed, and another thermal switch when responding effecting operation of the motor at a relatively high speed, the speed regulation being effected by selective excitation of the motor primary windings.

Where such a motor has been so employed there has been presented the problem of protecting the motor drive of the compressor against shock when the high speed winding of the motor is disconnected and the low speed winding is again connected in circuit as the result of tripping of the high speed thermal switch, the low speed thermal switch remaining set for running. To meet this problem means such as decelerating relays have been added, but the added means have complicated the control and increased materially the cost thereof.

The present invention has among its objects to provide for motors of the aforementioned type a simple and inexpensive controller which when the motors are employed as before mentioned will eliminate the problem aforediscussed.

Other objects and advantages of the invention will hereinafter appear.

The accompanying drawing illustrates diagrammatically one embodiment of the invention which will now be described, it being understood that the embodiment illustrated is susceptible of modification without departing from the scope of the appended claims.

Referring to the drawing, it shows a motor M having primary windings $P^1$ and $P^2$ to be connected selectively to lines $L^1$, $L^2$ and $L^3$ of a three phase alternating current supply circuit. It will be assumed that primary $P^1$ when excited effects a relatively low speed operation of the motor, while the primary $P^2$ when excited effects a relatively high speed operation of the motor.

A triple pole switch 1 is provided to connect the primary $P^1$ to the supply circuit, while a triple pole switch 2 is provided to connect the primary $P^2$ to the supply circuit. These switches which in practice may be of any desired type are provided with operating electromagnets 3 and 4, respectively. The switches are biased to open position and are adapted to be closed by their respective electromagnets. The electromagnets are provided with control switches 5 and 6, respectively, to connect the same to a suitable source of supply, as for example two lines of the supply circuit for the motor. For purposes hereinafter set forth the switch 2 is provided with normally disengaged auxiliary contacts 7 and with normally engaged auxiliary contacts 8, the contacts 7 to be engaged and the contacts 8 to be disengaged when the switch 2 is moved to closed position.

The control switches 5 and 6 are shown as comprising bimetal elements to respond under different predetermined thermal conditions, the switch 5 being responsive in advance of the switch 6. These switches which might be of any other preferred type are normally open and the circuit arrangement is such that when both switches are open both motor switches 1 and 2 are deenergized to disconnect the motor from circuit.

When the thermal switch 5 closes it completes circuit from line $L^3$, by conductors 9 and 10 through the normally closed auxiliary contacts 8 of switch 2, by conductor 11 to and through the electromagnet 3 of switch 1, by conductors 12 and 13 to line $L^2$. This circuit provides for energization of magnet 3 to close switch 1, thereby connecting in circuit the motor primary $P^1$ for starting of the motor to operate at a relatively low speed.

When the thermal switch 6 closes circuit may be traced from line $L^3$, by conductor 9, through thermal switch 5, by conductor 14, through thermal switch 6 to and through the electromagnet 4 of switch 2, by conductors 16 and 13 to line $L^2$. This circuit provides for energization of electromagnet 4 to close switch 2 to connect in circuit the motor primary $P^2$ for operation of the motor at a relatively high speed, and closure of switch 2 opens at its auxiliary contacts 8 the circuit of electromagnet 3, causing switch 1 to open for disconnection of the motor primary $P^1$.

Furthermore switch 2 upon closing engages its auxiliary contacts 7 and through these contacts establishes a maintaining circuit for itself independently of the thermal switch 6. This maintaining circuit may be traced from line $L^3$ by conductor 9, through thermal switch 5, by conductors 14 and 17, through contacts 7 to and through the electromagnet 4 by conductors 16 and 13 to line $L^2$. Thus it will be seen that while closure of motor switch 2 is dependent upon closure of thermal switch 6 it will remain closed upon opening of switch 6, and until its maintaining circuit is interrupted by opening of the low speed thermal switch 5. Also it will be observed that so long as switch 2 remains closed switch 1 remains open because of interruption of its energizing circuit at the auxiliary contacts 8 of switch 2.

Thus the controller illustrated automatically affords selectively low speed and high speed connections of the motor, but prevents reestablishment of the low speed connections upon opening of the high speed thermal switch, the motor when once brought to high speed continuing at such speed until both thermal switches 5 and 6 open. This entirely eliminates the above discussed problem heretofore met with and does so without requiring use of added instrumentalities with increased complications and increased cost. Moreover, the control proposed herein obviously is without disadvantage in maintaining high speed operation of the motor until the motor is stopped, whereas the function of the low speed thermal switch 5 to stop the motor when running at low speed is not in anywise impaired.

What I claim as new and desire to secure by Letters Patent is:

1. In a controller for motors having windings to be energized selectively for different speeds, in combination, means for connecting the motor windings selectively to a source of supply, automatic devices responsive one after another under predetermined conditions, the first to cause said means to effect connection of the motor for a relatively slow speed, and another to cause said means to effect connection of the motor for a relatively high speed, and means effective upon establishment of the latter connections to cause the first mentioned means to maintain said latter connections pending further operation of said devices to insure disconnection of the motor from the supply source for stopping.

2. In a controller for motors having windings to be energized selectively for different speeds, in combination, means for connecting the motor windings selectively to a source of supply, thermal devices responsive one after another under predetermined thermal conditions, the first to cause said means to connect the motor for relatively slow speed operation, and another to cause said means to connect the motor for relatively high speed operation, and means effective upon establishment of the latter connection to maintain the first mentioned means effective to continue high speed connection of the motor pending further operation of said devices to cause said first mentioned means to stop the motor.

3. In a controller for motors having windings to be energized selectively for operation of the motor at a relatively low speed or a relatively high speed, in combination, means for connecting the motor to a source of supply for excitation of its low speed winding, means for connecting the motor to its source of supply for excitation of its high speed winding and in so doing to cause the first mentioned means to interrupt the motor connections established thereby, and automatic control means for both former means providing for starting of the motor and operation thereof at relatively low speed subject to change to relatively high speed under predetermined conditions, the second mentioned means having associated therewith means to render it after response effective to continue high speed operation of the motor pending operation of said automatic means to effect stopping of the motor.

4. In a controller for motors having low speed and high speed windings to be energized selectively, in combination, means comprising a thermal device and a switch controlled thereby for establishing low speed connections for the motor under predetermined thermal conditions, and means comprising a thermal device and switch controlled thereby for thereafter establishing high speed connections for the motor under predetermined thermal conditions, the last mentioned switch having means including the first mentioned thermal device to render it independent of its respective thermal device for maintaining high speed connections pending operation of said first mentioned thermal device to insure stopping of the motor.

5. In a controller for motors having low speed and high speed windings to be energized selectively, in combination, electroresponsive switches to be energized selectively to effect low speed and high speed operations of the motor, automatic means responsive under predetermined conditions to energize the low speed switch and thereafter under predetermined conditions to energize the high speed switch and a maintaining circuit for the high speed switch rendering it effective after response to maintain high speed operation of the motor pending subsequent operation of said automatic means to effect disconnection of the motor for stopping.

6. In a controller for motors having low speed and high speed windings to be energized selectively, in combination, electroresponsive switches to be energized selectively to effect selectively relatively low and high speed operations of the motor, an automatic device responsive under predetermined conditions to energize the low speed switch subject to deenergization thereof upon response of the high speed switch, an automatic device responsive under predetermined conditions to establish for the high speed switch an energizing circuit controlled also by the first mentioned automatic device, and a maintaining circuit for the high speed switch established upon response thereof to maintain it energized independently of the second mentioned automatic device but subject to deenergization by the first mentioned automatic device.

7. The combination with a motor having low speed and high speed windings, of electroresponsive switches to be energized selectively to energize selectively the low speed and high speed windings of said motor, a thermal device responsive under predetermined thermal conditions to energize the low speed switch subject to deenergization thereof upon response of the high speed switch, a thermal device responsive under predetermined thermal conditions to establish for the high speed switch an energizing circuit dependent for completion upon prior response of the first mentioned thermal device, and a maintaining circuit for the high speed switch established thereby upon responding, said maintaining circuit being independent of the second mentioned thermal device but being subject to interruption by the first mentioned thermal device when the latter returns to a given normal position.

KARL O. SWANSON.